J. SHERER.
Pole for Wagons and Sleighs.
No. 218,070. Patented July 29, 1879.
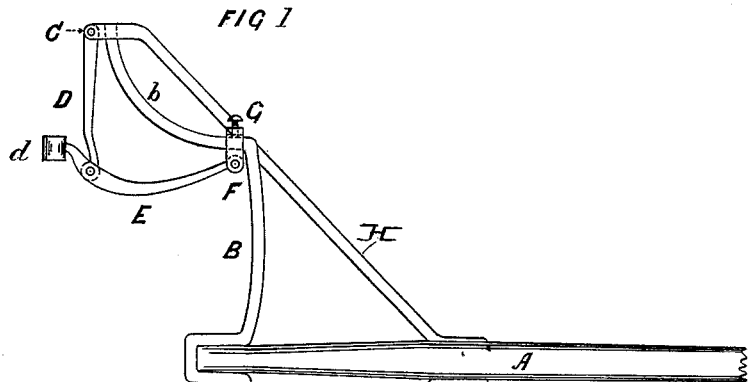

UNITED STATES PATENT OFFICE.

JOHN SHERER, OF MONTROSE, PENNSYLVANIA.

IMPROVEMENT IN POLES FOR WAGONS AND SLEIGHS.

Specification forming part of Letters Patent No. 218,070, dated July 29, 1879; application filed June 6, 1879.

*To all whom it may concern:*

Be it known that I, JOHN SHERER, of Montrose, Susquehannah county, Pennsylvania, have invented, made, and applied to use a Combined Wagon and Sleigh Pole; and that the following is a full, clear, and correct description of the same, reference being had to the accompanying drawings, making part of this specification, and to the letters of reference marked thereon, in which—

Figure 1 is a view of my improved pole when used for a sleigh. Fig. 2 is a view of the same when used for a wide wagon, the eyes being thrown out or extended.

In the drawings like parts of the invention are pointed out by the same letters of reference.

The nature of the present invention consists in the construction, as more fully hereinafter set forth, of a combined wagon and sleigh pole; the object of the invention being the production of a pole that can be used with wagons differing in width, and with sleighs when desired.

To enable those skilled in the arts to make and use the invention, I will describe its construction and operation.

A shows the pole, the lower end of which is attached to the cross-bar B. The outer ends of this bar B are curved outward, as at b, and upon the ends of the same are fastened the loops C, within which are pinned the links D, connected to the bent or curved levers E, the forward ends of which are provided with the eyes d, while their rear ends are pinned to the boxes F, free to move upon the curved outer ends of the bar B, and are retained in any desired position thereon by the set-screws G.

Side braces, H, extend from the pole A to the ends of the cross-bar B and strengthen the connection of the pole A and cross-bar B.

Such being the construction, the operation is as follows: The pole, as stated, is intended to be adapted to wagons differing in width, as well as to sleighs, and this adaptation of the pole is effected by moving the bent or curved levers E forward or back over the curved outward portions, b, of the cross-bar B until the eyes d are brought into proper position for attachment to the axle of the wagon or the forward portion of the runners of the sleigh, and then, by tightening the screws G, holding the boxes F upon the curved outer ends of the bar B.

Among the advantages resulting from such a construction of the pole as named are these: that when the eyes are brought together for attaching the pole to a sleigh the pole is necessarily shortened, which brings the horses the same relative distance from the sleigh that they would be if the pole were attached to a wagon, and when attached to a wagon the pole is lengthened necessarily to allow the horses to clear the forward wheels, which project beyond the axle half their diameter.

Having now set forth my invention, what I claim as new is—

The combination of the pole A, cross-bar B, with curved-outward ends b, the links D, curved levers E, provided with the eyes d and boxes F, and set-screws G, constructed and operating substantially as and for the purpose set forth.

JOHN SHERER.

In presence of—
C. N. WARNER,
ASA KENYON.